United States Patent [19]
Andrews

[11] Patent Number: 6,122,682
[45] Date of Patent: Sep. 19, 2000

[54] COMMUNICATION SYSTEM FOR CONTROLLING DATA PROCESSING ACCORDING TO A STATE OF A COMMUNICATION TERMINAL DEVICE

[75] Inventor: Scott Andrews, Seto, Japan

[73] Assignee: Toyota Jidosha Kabushiki Kaisha, Toyota, Japan

[21] Appl. No.: 09/045,644

[22] Filed: Mar. 23, 1998

[30] Foreign Application Priority Data

Mar. 24, 1997 [JP] Japan .................................. 9-070031

[51] Int. Cl.⁷ .................................................. G06F 13/00
[52] U.S. Cl. ............................... 710/65; 710/14; 710/65; 701/211
[58] Field of Search ................................ 701/211, 220; 340/995, 996; 710/38, 65, 69, 106, 131, 14

[56] References Cited

U.S. PATENT DOCUMENTS

| | | | |
|---|---|---|---|
| 5,144,318 | 9/1992 | Kishi | 342/357 |
| 5,148,153 | 9/1992 | Haymond . | |
| 5,303,343 | 4/1994 | Ohya et al. | 395/200 |
| 5,406,492 | 4/1995 | Suzuki | 364/449 |
| 5,410,486 | 4/1995 | Kishi et al. | 364/449 |
| 5,475,599 | 12/1995 | Yokoyama et al. | 364/449 |
| 5,539,810 | 7/1996 | Kennedy, III et al. . | |
| 5,893,894 | 4/1999 | Moroto et al. | 701/53 |

FOREIGN PATENT DOCUMENTS

| | | |
|---|---|---|
| 0751639 | 1/1997 | European Pat. Off. . |
| 0768632 | 4/1997 | European Pat. Off. . |
| 19517126 | 11/1995 | Germany . |
| 5-89399 | 4/1993 | Japan . |
| 7-332997 | 12/1995 | Japan . |
| 98/43192 | 10/1998 | WIPO . |

*Primary Examiner*—Thomas C. Lee
*Assistant Examiner*—Chun Cao
*Attorney, Agent, or Firm*—Pillsbury Madison & Sutro LLP

[57] ABSTRACT

A subject is to select a type of an output depending on a user's state. A file type recognizer (14) recognizes whether an incoming file has audio data, graphic data, or text data, and informs a command processor (26) of it. The command processor (26) determines whether a vehicle is in motion or not by a detection result from a motion/speed sensor (28), and controls a graphic/audio converter (20) and a text/audio converter (24). If a vehicle is in motion, text data is converted to audio data by the text/audio converter (24) and output from a speaker (18). Graphic data is converted into an audio summary by a graphic data converter and output from the speaker (18).

8 Claims, 2 Drawing Sheets

COMMUNICATION SYSTEM FOR CONTROLLING DATA PROCESSING ACCORDING TO A STATE OF A COMMUNICATION TERMINAL DEVICE

BACKGROUND OF THE INVENTION

1. Field of the Invention

The present invention relates to a communications terminal device, a communications system, and a storing medium for storing a program to control data processing by the communications terminal device. More specifically, it is related to the systems that convert received data into an appropriate data type using the communications terminal device.

2. Description of the Prior Art

In accordance with recent development of electronic communications technologies, a plurality of data communications has been available. Especially, with down-sizing of communications terminals and popularity of mobile communications, in-vehicle terminals and portable terminals are being widely used.

For example, Japanese Patent Laid-Open Publications No. Hei 5-89399 shows a system of communications between a mobile terminal in a vehicle, and a traffic information center. By this system, it is possible for a mobile terminal to down-load traffic information and display it on screen. Therefore, it is possible by this system to receive information from a traffic information center upon necessity while a vehicle is in motion.

However, the interface (man-machine interface) between the user and conventional in-vehicle or portable terminals has not been good enough. In other words, a user will be greatly influenced by an ever-changing environment when using an in-vehicle or portable terminal. Conventional terminals have not dealt with this problem. For example, a driver should pay attention to the surroundings while driving, so he cannot watch a display with full attention. However, a conventional in-vehicle terminal only displays text data when it is sent, which is not convenient for a user. Also, depending on the situation in which a communications terminal is placed, audio outputs may not be appropriate. For example, a user does not want to hear an audio message from a portable terminal during a meeting. Insufficient attention has been given for cases like this.

SUMMARY OF THE INVENTION

The present invention is created to solve problems like the above. It is also intended to provide a communications terminal and a system which optimizes the output based on a user's state, and a storage medium to store a program to control these.

This invention relates to a communications terminal used in a communications system, comprising means for receiving incoming data being transmitted, means for detecting the data type of the data received, means for detecting the state in which the communications terminal is placed, means for converting received data into an appropriate data type depending on the data type detected by the detection means and the state detected by the state detection means, and means for outputting the converted data in a manner indicated by the data type.

As described above, in this invention, state detection means detect a state in which a communications terminal is placed. Based on this state, The communications terminal determines an output data type and performs conversion of the data into a data type appropriate for a user. For example, if a user is in a moving car, text data is converted to, and is output as audio data. By this method, information is provided in an appropriate form to a user who is driving a vehicle.

Another aspect of this invention comprises a table which stores relationships between states and data types which are appropriate for each state, and means for comparing the data type which the state detection means decide to be appropriate for the state and the data type of the received data which is detected by the data type detection means. The conversion means described above change the data type of the received data if the data types above compared by the comparing means disagree. By having this table, the best output type is easily determined. The above communications terminal device is located in a vehicle, and the state detection means detect a state of a vehicle motion. By detecting the state of a car in motion using a speed sensor and the like, the state of the driver who is a user should be detected and an appropriate output form for the user should be chosen.

This invention has at least a text type and an audio type as data types to be transmitted. The outputting means comprise a display and a speaker. The converting means decide, only if the received data is text data, whether the original text data is output as it is or as audio data converted from it.

A further aspect of the present invention comprises means for inputting data, means for composing an outgoing data in a plurality of format types, based on the data input by the inputting means, means for inferring a type of the outgoing data suitable for a communications terminal device to receive the data, and means for transmitting the outgoing data composed by the composing means. It composes the outgoing data using the composing means in a type inferred by the inferring means, and transmits the composed outgoing data by the transmitting means. By considering the state of a sender, a recipient should reply in a format suitable for that sender's state.

This invention is also a communications system in a plurality of data types. The transmitter transmits data in predetermined formats. The receiver recognizes a format of the data received, detects the state of the receiver, converts the data type of the received data to a type suitable for the receiver's detected state, and outputs the converted data. By this communications system the above described selection of an output data type can be done. It is also preferable to communicate not only via communications terminals but also via a fixed communications center and the like. In this case, a communications center has means for conversion so that down-sizing of a communications terminal is realized.

This invention is also a storing medium to store a program to control data processing by the communications terminal. It stores a program to detect the type of data received, to detect a state of a receiver, and to convert the received data to a suitable data type, in accordance with the type of data received and the state of the receiver.

DESCRIPTION OF THE PREFERRED EMBODIMENTS

Preferred embodiments of the present invention will now be described with reference to the accompanying figures.

Explanation of the Whole System

Figure 1:
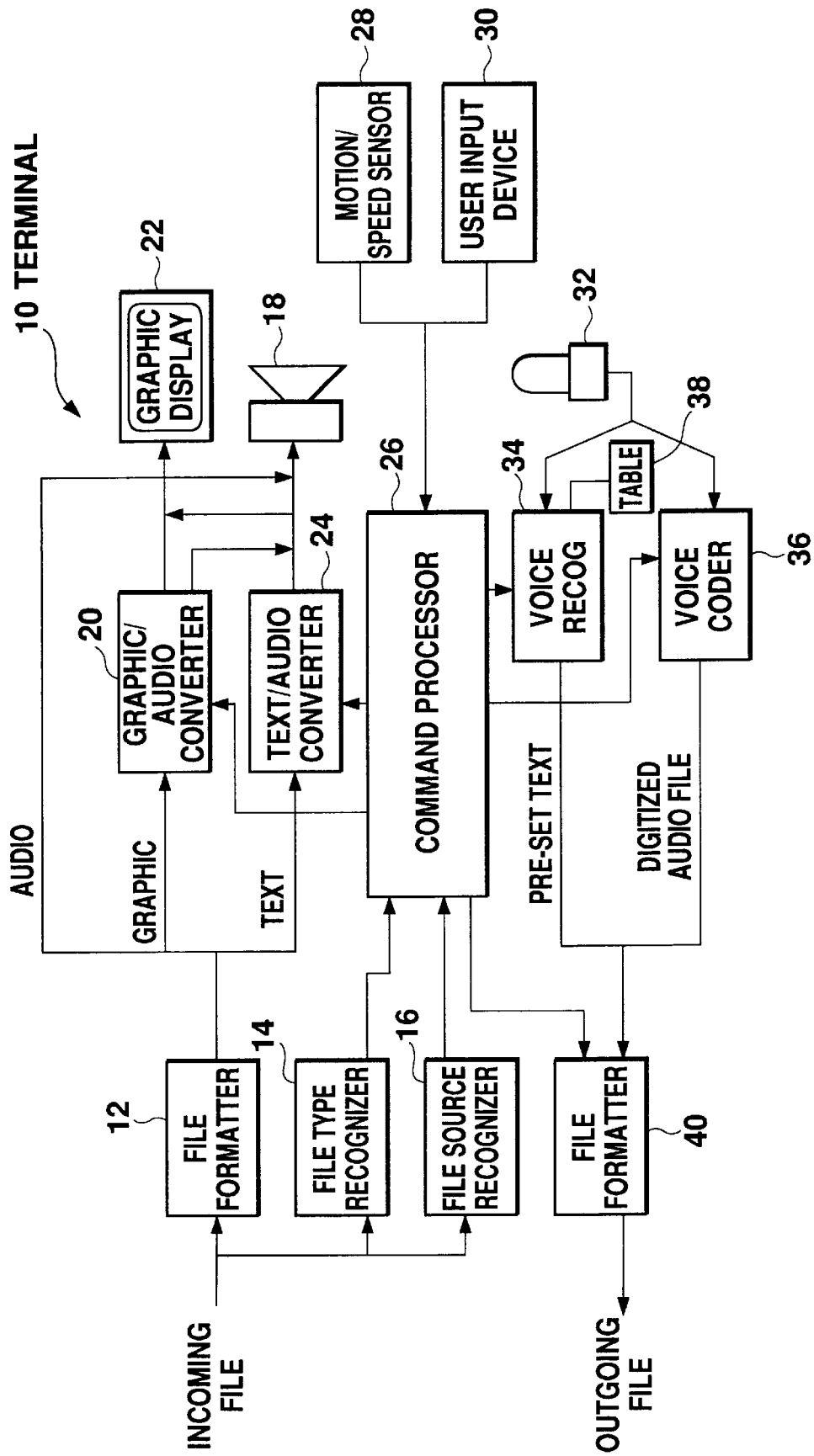
FIG. 1 is a block diagram showing a configuration of a communications terminal device related to an embodiment of the present invention.

FIG. 1 is a block diagram showing a configuration of a communications terminal device related to the present embodiment. An incoming file transmitted from outside is input as a demodulated input file via a cellular phone and a modem. This input file is supplied to a file formatter 12, a file type recognizer 14, and a file source recognizer 16. The file formatter 12 arranges the form of a file (i.e., format) suitable for the data type of the input data. The file type recognizer 14 recognizes a data type if it is an audio file, a graphic file or a text file. The file source recognizer 16 recognizes a type of a transmitter terminal by a content of the input file. In other words, it recognizes if the terminal is an in-vehicle, a portable, or a fixed one. The file type and the type of the transmitter terminal are recorded in a header of a communication file which is at the beginning of the communication file. It is also preferable to add a state of the terminal (i.e., in-motion, or stationary) and a request for a data type of a replying file to the communication file if the transmitter is an in-vehicle or a portable one.

Audio data from the file formatter 12 is supplied to a speaker 18 where it is output. Graphic data is supplied to a graphic data converter 20 where conversion of the data format is performed if necessary. In other words, if conversion is necessary, audio signals to explain the content of the graphic data are generated. Graphic data which was not converted by the graphic data converter 20 is supplied to a graphic display 22 and displayed as it is. Audio signals obtained by the graphic data converter 20 are supplied to the speaker 18 and output thereby. Text data supplied from the file formatter 12 is supplied to a text data converter 24. The text data converter 4 then converts the text data into audio data. In other words, audio signals corresponding to each word of the text data are synthesized. Text data which was not converted by the text data converter 24 is supplied to the graphic display 22 as it is and displayed thereby. If the text data converter 24 converts text data to audio signals, the audio signals obtained are supplied to the speaker 18 and output thereby.

A command processor 26 controls each process of the present communications terminal, based on the incoming information. Recognition results from the file type recognizer 14 and the file source recognizer 16 are provided to the command processor 26. Information about vehicle speed detected by a motion/speed sensor 28 and the commands from a user input device 30 are also provided to the command processor 26. The user input device 30 comprises a keyboard and the like. The command processor 26 determines the state of the user (in this case a driver), based on a motion/speed sensor 28, in this case based on a speed of a vehicle. Based on the state recognized, the command processor 26 controls the graphic/audio converter 20 and decides whether conversion to an audio data should be performed or not. In other words, if a vehicle is in motion, conversion is done by the graphic/audio converter or the text/audio converter, and an input file (graphic or text data) is converted to an audio data and output from the speaker 18.

The present communications terminal device 10 has a microphone 32 as an input device. A user can input audio signals via the microphone 32. The audio signals input through the microphone 32 are supplied to both an voice recognizer 34 and a voice coder 36. A table 38 is connected to the voice recognizer 34. The voice recognizer 34 recognizes limited voice sounds and reads out a corresponding text data from the table 38. For example, if the input voice sounds are "driving, later", text such as "I am driving. I will respond later." is composed. By inputting a number such as 1, 2, 3, . . . through the microphone, it is also possible to read out a corresponding text data. It is also possible to output a pre-recorded guide message from the speaker 18 and select a text data by replying through the microphone 32.

The voice coder 36 codes audio signals by a method such as PCM, and obtains a digitized audio file. The text data obtained by the voice recognizer 34 and the digitized audio file obtained by the voice coder 36 are provided to a file formatter 40. Text data from the command processor 26 is also provided to the file formatter 40. This text data is, for example, an input from the user input device 30. The file formatter 40 formats incoming data into a format suitable for transmission, and sends it out as an output file. This output is performed via a cellular phone and a modem. Means for transmitting or receiving data can be of any type such as one that directly uses a communications satellite channel.

In a communications terminal 10 of the present embodiment, the command processor 26 decides an output data type, based on a vehicle motion recognized by the motion/speed sensor 28 and a type of the transmitter recognized by the file source recognizer 16. For example, if a vehicle is in motion, the command processor 26 automatically selects the microphone as a replying method and waits for an input by a user. It is also preferable to output a guide message from the speaker. The voice coder then transmits a digitized audio file. If it is known that a recipient is at a meeting, it is preferable to transmit a text data generated by the voice recognizer 34.

Explanation about Data Conversion

Data conversion upon receipt is now explained referring to Table 1. A case of in-vehicle communications terminal was explained in the above embodiment, but cases of portable communication terminal are included in the Table 1.

TABLE 1

| RECEIVER CONTROL TABLE EXAMPLE | | | | | |
|---|---|---|---|---|---|
| CURRENT STATE | TEXT | AUDIO | IMAGE/ GRAPHIC | HTML/ VRML | APPLET |
| IN CAR-MOVING | AUDIO | AUDIO | AUDIO SUMMARY | AUDIO SUMMARY | AUDIO SUMMARY |
| IN CAR-STOPPED | TEXT | AUDIO | I/G | HTML/VRML | APPLET |
| PORTABLE-MOVING | AUDIO | AUDIO | AUDIO SUMMARY | AUDIO SUMMARY | AUDIO SUMMARY |
| PORTABLE-STOPPED | TEXT | AUDIO | I/G | HTML/VRML | APPLET |
| PORTABLE- | TEXT | TEXT | I/G | HTML/VRML | APPLET |

TABLE 1-continued

RECEIVER CONTROL TABLE EXAMPLE

| CURRENT STATE | TEXT | AUDIO | IMAGE/ GRAPHIC | HTML/ VRML | APPLET |
|---|---|---|---|---|---|
| QUIET |  | SUMMARY |  | AUDIO OFF | AUDIO OFF |
| ORIGINAL OVERRIDE | TEXT | AUDIO | I/G | HTML/VRML | APPLET |
| TEXT SUMMARY | TEXT | TEXT | TEXT | TEXT | TEXT |
| OVERRIDE | SUMMARY | SUMMARY | SUMMARY | SUMMARY | SUMMARY |

Seven states of the communications terminal are set as "in car-moving", "in car-stopped", "portable-moving", "portable-stopped", "portable-quiet (audio output prohibited)", "original override", and "text summary". Five data types are set as "text", "audio", "image/graphic", "HTML/VRML", and "Applet". HTML/VRML and Applet are communications data formats including a variety of data types, which are converted to ordinary data formats, depending on a responding system. If a vehicle is in motion, a text or an audio data is output as a voice message. Conversion of text data to audio data is performed by the text/audio converter 24, using ordinary audio synthesis. Image/graphic, HTML/VRML, and Applet are converted into audio summaries. An audio summary has a data type, data length, and a sender's name. Audio data itself is generated by audio synthesis. If a vehicle is stopped, an input file is output as it is without converting its data type. If a portable terminal is in motion, it is regarded the same as the "in car-moving". If it is stopped, it is regarded the same as "in car-stopped". In a case of "portable-quiet", audio output is better to be prohibited. Therefore, an audio data is converted to a text summary. The content of the summary is the same as described above. Otherwise an original is output as it is. If "original override" is set, an original file is output as it is, and if "text summary" is set, all files are output after conversion to text summaries.

The reply data type is determined, based on a user's state and a type of a recipient terminal device. This is explained referring to Table 2.

TABLE 2

REPLY CONTROL TABLE EXAMPLE

| CURRENT SENDER STATE | PORTABLE | MOBILE | FIXED | RECIPIENT OVERRIDE |
|---|---|---|---|---|
| IN CAR-MOVING | AUDIO | AUDIO | AUDIO | PER TABLE |
| IN CAR-STOPPED | TEXT/AUOIO | AUDIO | UNDERSTRICTED | PER TABLE |
| PORTABLE-MOVING | AUDIO | AUDIO | AUDIO | PER TABLE |
| PORTABLE-STOPPED | TEXT/AUDIO | AUDIO | UNDERSTRICTED | PER TABLE |
| PORTABLE-QUIET | PRE-SET TEXT MESSAGE | RECORDED AUDIO | PRE-SET TEXT MESSAGE | PER TABLE |

In this table, a current sender state is set as "in car-moving", "in car-stopped", "portable-moving", "portable-stopped", and "portable-quiet". Types of a receiver are "portable", "mobile", and "fixed". "Recipient override" means to adopt an output data type according to the Table 1. A data is transmitted in the same format as the incoming data. If a car or a portable is in motion, audio data is output regardless of a receiver terminal type. If a car or a portable is stopped, text or audio data is output. In a case of the receiver being a portable, audio data in a case of a mobile, any data in a case of a fixed.

As described above, replies can be done by selecting a variety of pre-recorded messages. In other words, a user enters a verbal command through the microphone 32 so that voice recognizer 34 can select a message corresponding to the command. It is preferable to select a message interactively, using a guide message from the speaker 18.

Effects of the Embodiment

In the present invention, conversion is controlled depending on a communications terminal being in motion or not. An appropriate output is made depending on a state of the communications terminal. Therefore, problems like text data being displayed that cannot be read while a user is in motion are resolved. Furthermore, an appropriate mode is selected upon reply, based on states of a sender and a recipient. By considering the type of the receiver terminal, data in a format best-suited for the recipient can be sent. Therefore, a more user-friendly man-machine interface is provided.

Another Embodiment

Figure 2:
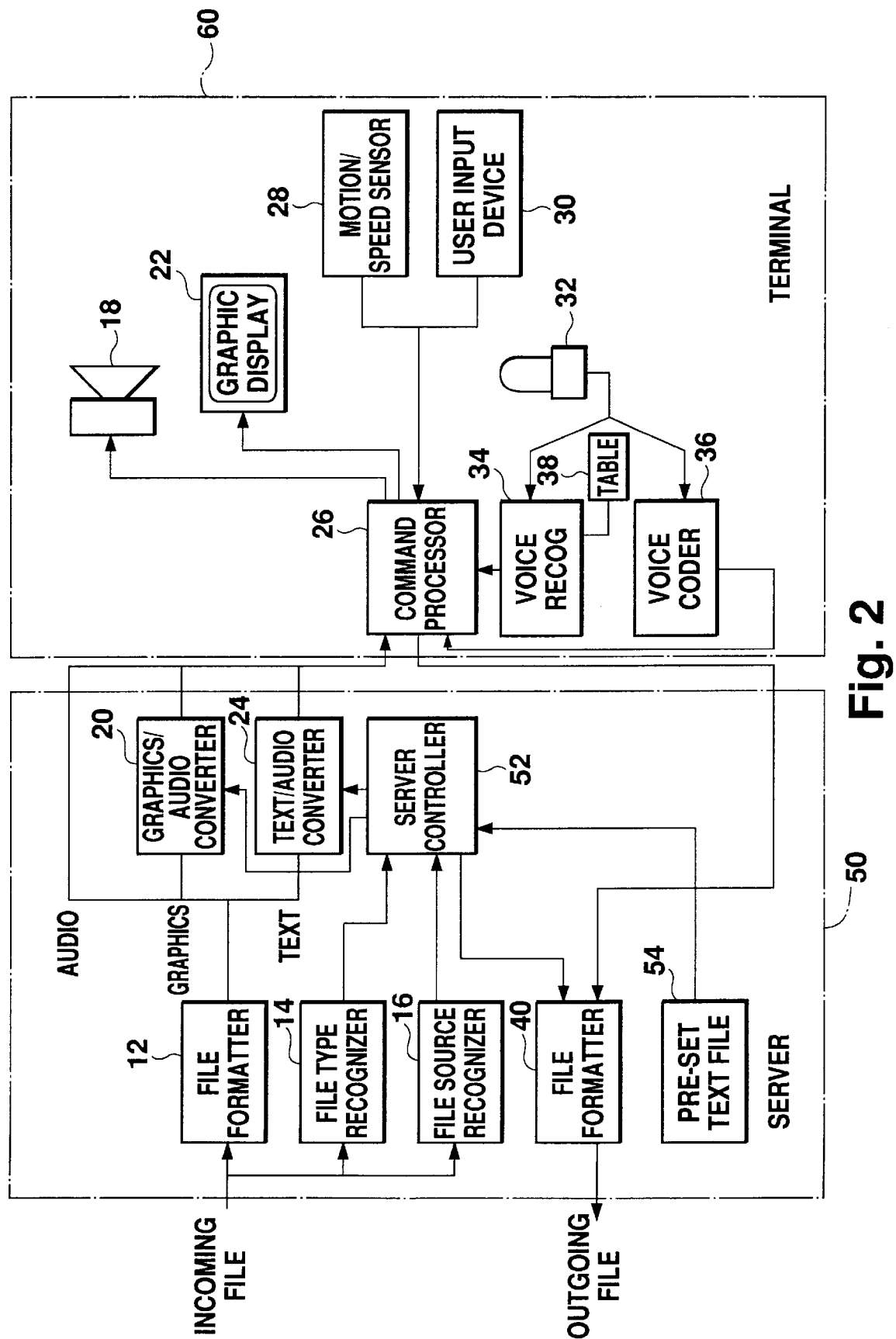
FIG. 2 is a block diagram showing another configuration of a communications terminal device related to the embodiment of the present invention.

FIG. 2 is a block diagram showing another configuration of a communications terminal device related to the present invention. In this embodiment, a fixed server 50 is set. The server 50 assumes a large portion of the functions of the communications terminal 10 described above. The rest of the functions are assigned to a communications terminal 60.

In other words, the server 50 has a server controller 52, as well as a file formatter 12, a file type recognizer 14, a file source recognizer 16, a graphic/audio converter 20, a text/audio converter 22, and a pre-set text file 54. In this figure, the server 50 is connected directly in line to the communications terminal device 60. However, an exchange of data is performed via communications. In other words, the server 50 is set in an information center which is fixed on the ground, and the communications terminal device 60 is a mobile terminal such as a portable or an in-vehicle one. The server 50 is also connected to a sender's terminal device through a telephone line and a relay, for example.

The communications terminal device 60 comprises a receiver 10, a speaker 18, a graphic display 22, a command processor 26, a motion/speed sensor 28, a user input device 30, a microphone 32, a voice recognizer 34, a voice coder 36, and a table 38.

The server 50 communicates with the communications terminal 60 after receiving a file from a sender to the communications terminal 60, and notifies the communications terminal 60 of its receipt. The communications terminal 60 determines its current state by a detection result of the motion/speed sensor 28, and notifies the server 50 of it. The server 50 decides an appropriate file format for the communications terminal 60, and converts the received file into the format decided. The server 50 then sends the converted file to the communications terminal 60. As described above, the communications terminal 60 does not necessarily have a conversion function, since the server 50 executes a conversion process. Therefore, down-sizing of the communications terminal 60 is feasible.

The server 50 has the pre-set text unit 54 inside, and a comparatively large volume of data can be stored here. Therefore, the communications terminal 60 can output suitable text by selecting it among the text stored here.

Other Configurations

A current state of a portable terminal device can be measured by a three-axis gyro or other motion sensor. A variety of data processing procedures may also be executed by the command processor 26.

In a case of an in-vehicle communications terminal, secure parking or stop of a vehicle may be detected by a shift-lever being positioned at "park", and a hand brake being pulled, and an output of text data or graphic data can be permitted on this occasion. It is also preferable to consider vehicle sizes and road conditions such as "on highway", or "in-city". This kind of information can be obtained from a car navigation system.

It is also preferable to separate a data processing unit from a component for communication so that the data processing unit becomes portable. By this separation, a variety of procedures such as entering data are performed by the data processing unit. Later it can work as a communications terminal device by connecting it to the component for communication. It is possible to take out a data processing unit from an in-vehicle terminal and a variety of procedures such as entering data can be done indoors.

It is also preferable to improve a voice recognizer so that it converts input voice signals into a text data. In a voice recognition process, the voice recognizer will be more secured by recognizing a situation, i.e., a kind of data received, and a state in which a reply is carried out. Based on the detection results above, it is also preferable to limit pre-recorded audio data and a text data to be chosen from.

What is claimed is:

1. A communication terminal device used in a communication system, comprising:
    a receiver for receiving data;
    a data type detector for detecting the data type of the received data;
    a state detector for detecting a state of the communication terminal device;
    a converter for converting the received data to an appropriate data type in accordance with the data type detected by the data type detector and the state detected by the state detector;
    an output device for outputting the data converted;
    an input device for inputting data;
    a composer composing outgoing data in a plurality of data types in accordance with a data input by the input device;
    an inferring device for inferring the data type of the outgoing data which is suitable for a transmitter of the communication terminal device; and
    a transmitter for transmitting the outgoing data composed by the composer, wherein the outgoing data in a data type inferred by the inferring device is composed by the composer and transmits the composed outgoing data by the transmitter.

2. A communications terminal device according to claim 1, wherein
    the communications terminal device is located in a vehicle and the state detector detects the motion state of the vehicle.

3. A communications terminal device according to claim 1, further comprising:
    a table for storing relationships between states and data types suitable for each state;
    a comparator for comparing a data type which is determined by the state detector to be suitable for the state and a data type of the received data detected by the data type detector;
    whereby the convertor converts the data type of the received data into another type if the comparison result of both data types detected by the comparator is different.

4. A communications terminal device according to claim 3, wherein
    the communications terminal device is located in a vehicle and the state detector detects the motion state of the vehicle.

5. A communications terminal device according to claim 4, wherein
    types of data to be transmitted include at least a text type and an audio type, and
    a convertor that decides, in a case of received data being text data, whether the text data should be output as it is or the text data should be converted into audio data, in accordance with a motion state detected by the state detector.

6. A communication terminal device used in a communication system, comprising:
    a receiver for receiving data;
    a data type detector for detecting the data type of the received data;
    a state detector for detecting whether or not the communication terminal device is moving;
    a converter for converting the received data to an appropriate data type in accordance with the data type detected by the data type detector and the state detected by the state detector;
    an output device for outputting the data converted;
    an input device for inputting data;
    a composer composing outgoing data in a plurality of data types in accordance with a data input by the input device;
    an inferring device for inferring the data type of the outgoing data which is suitable for a transmitter of the communication terminal device; and
    a transmitter for transmitting the outgoing data composed by the composer, wherein the outgoing data in a data type inferred by the inferring device is composed by the composer and transmits the composed outgoing data by the transmitter.

7. A communication apparatus which performs data communications in a plurality of data types wherein a receiver recognizes a pre-determined data type of received data, detects a state of the apparatus, converts the data type of the received data in accordance with the state detected, and outputs the converted data, receives input data from an input device, composes outgoing data in at least one of a plurality of data types in accordance with the input data, infers the data type of the outgoing data so that it is suitable for a transmitter of the apparatus in accordance with the state detected, and transmits the outgoing data composed by the composer.

8. A storing medium for storing a program to control data processing by a communication terminal device, wherein the program detects the data type of the received data and the state of the communication terminal device, and converts the received data to the state of the communication terminal device, receives input data from an input device, composes outgoing data in at least one of a plurality of data types in accordance with the input data, infers the data type of the outgoing data so that it is suitable for the communication terminal device in accordance with the state detected, and transmits the outgoing data composed by the composer.

* * * * *